United States Patent [19]

Ho

[11] Patent Number: 5,784,167
[45] Date of Patent: Jul. 21, 1998

[54] METHOD OF MEASURING THICKNESS OF A MULTI-LAYERS FILM

[75] Inventor: Chao-Huang Ho, Hsinchu, Taiwan

[73] Assignee: United Microelectronics Corp., Hsinchu, Taiwan

[21] Appl. No.: 753,916

[22] Filed: Dec. 3, 1996

[51] Int. Cl.⁶ .................... G01N 21/41; G01N 21/21
[52] U.S. Cl. ............................. 356/369; 356/362
[58] Field of Search .......................... 356/369, 381, 356/382; 256/559.27, 559.28

[56] References Cited

U.S. PATENT DOCUMENTS

| | | | |
|---|---|---|---|
| 4,906,844 | 3/1990 | Hall | 356/369 |
| 5,420,680 | 5/1995 | Isobe et al. | 356/369 |

*Primary Examiner*—Richard A. Rosenberger
*Attorney, Agent, or Firm*—Bacon & Thomas

[57] ABSTRACT

A multi-layers with (m+1) sublayers is formed on a substrate. The purpose of the present invention is to measure the thickness of the sublayer (m+1) using the ellipsometry even the physical parameters of the other sublayers are unknow. The key of the method is to reguard the multi-layers (sublayer 1/sublayer 2/ . . . /sublayer m) as a reduced layer. Then the multi-layers becomes a double layers formed on a substrate, that is a sublayer (m+1) and a reduced layer. Assume that the sublayer (m+1) is composed of material M. Then the multi-layers becomes a double M layers formed on a substrate, that is a M layer and a reduced layer. A first measurement is performed to measure the thickness (T1) of the double layers by using an ellipsometry. Next, a second measurement is done to measure the thickness (T2) of the reduced layer by using an ellipsometry. The thickness of the sublayer (m+1) can be obtained by performing (T1–T2).

4 Claims, 2 Drawing Sheets

METHOD OF MEASURING THICKNESS OF A MULTI-LAYERS FILM

FIELD OF THE INVENTION

The present invention relates to a method of measuring the thichness of a multi-layers, and more specifically, to a method for improving the accuracy of measuring the thickness of a multi-layers.

BACKGROUND OF THE INVENTION

The semiconductor technology that ultimately led to the integrated circuit (IC) was over 75 years in the making. Since the creation of the first integrated circuit in 1960, there has been an ever increasing density of density on semiconductor substrates. Circuit design has a trend to space-saving features. Two or three layers of interconnections between circuit elements are now used, and the number of active devices required to perform a given function has decreased. Process in VLSI manufacturing technology seems likely to continue to proceed in this manner.

Dynamic Radom Access Memory (DRAM) devices are useful technology drivers. As the size of DRAM is scaled down, the mount of stored charge needed to maintain reliable memory operation remains the same. This increased storage capacity requirement has driven research into new dielectric materials and memory cell structures. The gole of this research has been to achieve thinner dielectrics with higher dielectric constants, and increased capacitor area using trench or stacked cell capacitor structure.

Ellipsometer has been a research technique in the study of a film. Typically, the thickness of a film which is formed on a wafer is measured by a spectroscopic ellipsometer. Ellipsometers measure the change in the state of polarized light upon reflection from a surface. The state of polarization is determined by the amplitude ratio ($\psi$) of the parallel (p) and perpendicular (s) components of radiation and phase-shift differfnce (A) between the two components. The "fundamental equation of ellipsometry" relates the parameters as a complex amplitude reflection ratio $\rho: \rho = r_p/r_s = \tan(\psi)\exp(i\Delta)$ where the reflection cofficients $r_p$ and $r_s$ are defined as the ratio of the reflected to incident electric field components for the parallel and perpendicular directions. The parameters of interest, usually a combination of thickness and refractive index, are calculated from the measured parameters. Single wavelength, single angle of incidence ellipsometers are limited in their analysis capability due to only two physical parameters, $\psi$ and $\Delta$. Multiple wavelength or spectroscopic ellipsometers (SE), which measure hundreds of tan$\psi$ and cos$\Delta$ values, are capable of determining multiple parameters through data regression. Analysis of these data is a complicated task, especially, when the film with multi-layer (that is more than two layers). The thickness of the multi-layer determinded by a conventional method is limited by deviation arisen from its analysis capability. For example, the thickness of a SiN (silicon nitride) layer in a multi-layer ($SiN/SiO_2/polysilicon/SiO_2$) can be determinded while the refractive indexs (N-iK) of SiN, $SiO_2$ and polysilicon are known. The refractive indexs of SiN and $SiO_2$ are typically (N=2, K=0), (N=1.46, K=0), respectively. Unfortunately, N parameter of polysilicon has a range between 3.6–4.5, while K is from 0.05 to 0.2. Therefore, thickness and refractive index analysis are limited due to the large range of the N, K of polysilicon. Further, New materials and the processing trend toward sequential deposition of multi-layers structures (for example, silicon dioxide/silicon nitride/silicon dioxide) needs for accurate determination of refractive index and simultaneous multi-layers thickness measurements. It has a barrier by using the conventional method to determined the thickness of a layer while the thickness of the layer is thinner than 50 angstroms.

SUMMARY OF THE INVENTION

A multi-layers with (m+1) sublayers is formed on a substrate. The purpose of the present invention is to measure the thickness of the sublayer (m+1) using the ellipsometry even the physical parameters of the other sublayers are unknow. For example, the refractive indexs (N-iK) of first sublayer, the second sublayer ... and the mth sublayer are unknown. The thickness of the (m+1) sublayer still can be measured by present invention.

One key of the method is to reguard the multi-layers (sublayer 1/sublayer 2/ ... /sublayer m) as a reduced layer. Then the multi-layers becomes a double layers formed on a substrate, that is a sublayer (m+1) and a reduced layer. For example, a multi-layers with (m+1) sublayers is formed on a substrate. Subayer 1, sublayer 2 ... and sublayer m are respectively formed on the substrate. The sublayer 1, the sublayer 2, ... and the sublayer m can be formed of any materials. The sublayer (m+1) is deposited on the sublayer m. The sublayer 1/sublayer 2/sublayer 3/ ... /sublayer m is reguarded as a reduced layer. Assume that the sublayer (m+1) is composed of material M. Then the multi-layers becomes a double M layers formed on a substrate, that is a M layer and a reduced layer. A first measurement is performed to measure the thickness (T1) of the double layers by using an ellipsometry. Next, a second measurement is done to measure the thickness (T2) of the reduced layer by using an ellipsometry. The thickness of the sublayer (m+1) can be obtained by performing (T1–T2).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In the present invention, a new method is disclosed to measure the thickness of a multi-layers by using an ellipsometry. The major differences between prior art and the present invention are the measuring method and the way to achieve the thickness parameter. The feature of the method is that twice measurements are performed to measure the thickness of a layer for improving the accuracy of a layer's thickness. This method is used to measure the thickness of a layer of some material formed on top of a multi-layer. The other layers in the multi-layers are not made of the same material with the top layer. The method is to establish a fiction that all of the layers is a single layer that are made of the material of the top layer. The detail of the method will be described as follows.

Figure 1:
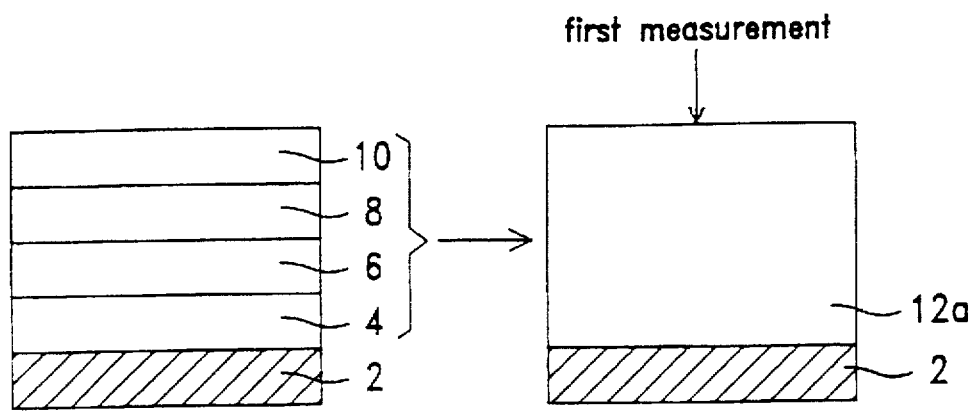
FIG. 1 is a first embodiment of the present invention.

As shown in FIG. 1, a multi-layers with four sublayers are respectively deposited on a semiconductor substrate 2. A first sublayer 4 is formed of silicon dioxide layer to have a thickness about 1000 angstroms. A second sublayer 6 is then formed to have a thickness about 2000 angstroms on the first sublayer 4. The second sublayer 6 is composed of polysilicon layer. A third sublayer 8 is formed on the second sublayer. The third sublayer 8 can be formed by any suitable material such as silicon oxide. In this embodiment, the thickness of the third sublayer is 30 angstroms. Next, a forth sublayer 10 is formed on the third sublayer 8. The forth sublayer 10 is formed of silicon nitride (SiN). The purpose of the present invention is to measure the thickness of the forth sublayer 10 using the ellipsometry even the physical parameters of the other sublayers are unknow. For example, while the refractive indexs (N-iK) of first sublayer, the second sublayer and the third sublayer are unknown, the thickness of the forth sublayer still can be measured by the present invention no matter what refractive indexs of the polysilicon or other materials are.

One key of the method is to reguard the $SiO_2$/polysilicon/$SiO_2$ multi-layers as a single reduced layer 12b and assume that the reduced layer 12b is formed of the material of the top layer. In the embodiment, the material is SiN. Then the multi-layers 12a becomes a double SiN layers formed on a substrate, that is a SiN layer and a reduced layer 12b. A first measurement is performed to measure the thickness of the double SiN layers by using an ellipsometry. Next, a second measurement is done to measure the thickness of the reduced layer 12b by using an ellipsometry.

First, turning to FIG. 1, assume that the multi-layers 12a (SiN/reduced layer 12b) is composed of silicon nitride layer (SiN). That is to say, both of the sublayers are formed of SiN. Then a first measurement is performed by using ellipsometry. Under such condition, a first fictional pseudo-thickness (T1) of the multi-layers 12a can be obtained.

Figure 2:
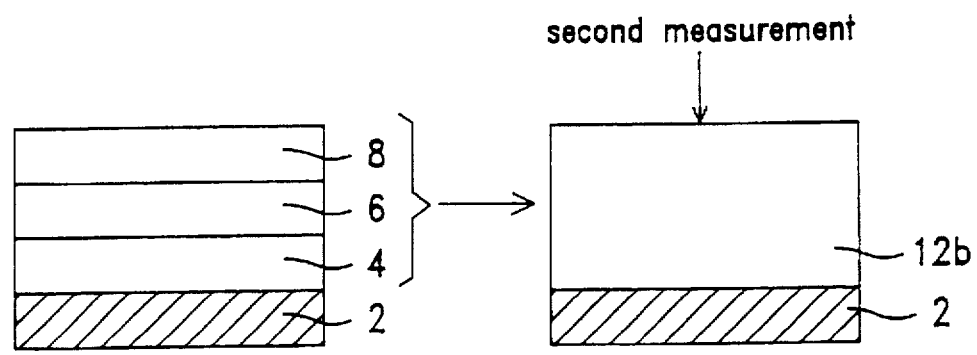
FIG. 2 is a first embodiment of the present invention.

Referring to FIG. 2, the second step of the method is to strip the forth sublayer 10, i.e. SiN layer. As if the entire reduced layer 12b is made of the material of the top layer.

Still referring to FIG. 2, further assume that the reduced layer ($SiO_2$/polysilicon/$SiO_2$) 12b is still composed of SiN. Subsequently, a second measurement is performed by using ellipsometry to acquir a second fictional pseudo-thickness (T2) of the multi-layers 12b.

The actual thickness of the forth sublayer 10 can finally be obtained by performing (T1–T2). Namely, the change in the two fictional pseudo-thickness is the actual thickness of the top (SiN) layer. The actual thickness is the difference of the first fictional pseudo-thickness and the second fictional pseudo-thickness.

The comparison between the method and the prior art can be seen in TABLE 1. If the exact refractive indexs (N-iK) of the polysilicon is 3.95–0.1i. In the TABLE 1, the deviations of the prior art are obtained by prior art method using 4.00–0.1i. Apparently, the deviations of the prior art larger than the ones of the present invention. The thickness of the SiN is denoted by T, the deviations of the prior art and the present invention are respectively represent by R1, R2.

As seen in TABLE 1, the thinner the SiN layer is the larger the R1 is. Especially, while the thickness of the SiN layer is 30 angstroms the deviations of the prior art (R1) is 106.6%, the deviations of the present invention is only 2.5%. The method is much better than the prior art.

TABLE 1

| T | R1(%) | R2(%) |
|---|-------|-------|
| 300 | 10.7 | 0.3 |
| 200 | 16.1 | 0.2 |
| 100 | 32.1 | 1.2 |
| 50 | 62.2 | 2.1 |
| 20 | 106.6 | 2.5 |

Alternatively, a fictional pseudo-thickness of the reduced layer ($SiO_2$/polysilicon/$SiO_2$ multi-layers) 12b can be measured first after the reduced layer 12b is formed. Then the top layer made of SiN is formed on the reduced layer 12b. The multi-layers 12a (SiN/reduced layer) is reguarded as a double SiN layers formed on a substrate. Next, a second measurement is performed to measure the thickness of the SiN layer by using an ellipsometry.

Figure 3:
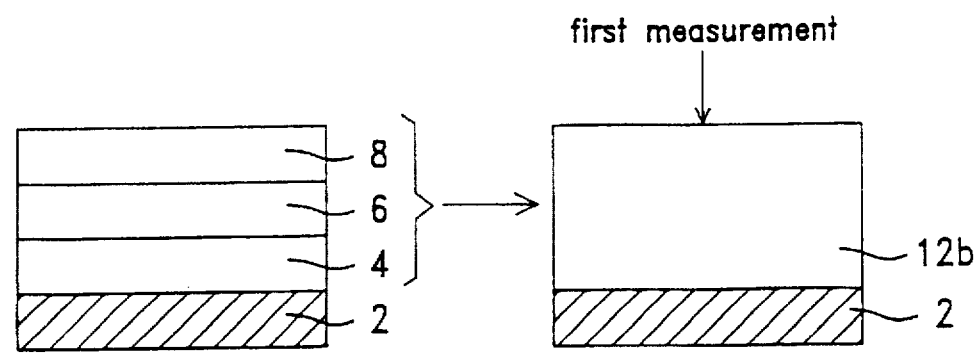
FIG. 3 is a second embodiment of the present invention.

First, turning to FIG. 3, assume that the reduced layer 12b ($SiO_2$/polysilicon/$SiO_2$) is composed of silicon nitride layer (SiN). That is to say, all of the sublayers are formed of SiN. Then a first measurement is performed by using ellipsometry. Under such condition, the fictional pseudo-thickness (T2) of the reduced layer 12b can be obtained.

Figure 4:
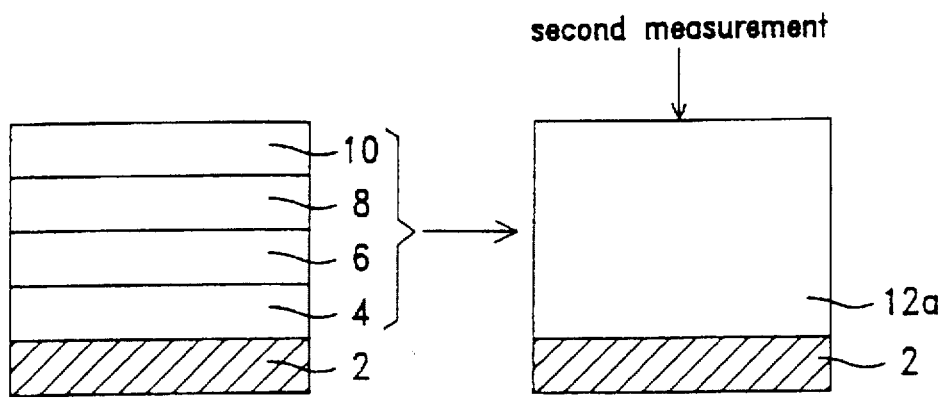
FIG. 4 is a second embodiment of the present invention.

Referring to FIG. 4, the next step of the method is to deposit a SiN layer on the reduced layer 12b, i.e. $SiO_2$/polysilicon/$SiO_2$ multi-layers.

Still referring to FIG. 4, further assume that the SiN/$SiO_2$/polysilicon/$SiO_2$ multi-layers 12a is still composed of SiN. Subsequently, a second measurement is performed by using ellipsometry to acquir the fictional pseudo-thickness (T1) of the multi-layers 12a.

The actual thickness of the forth sublayer (SiN) 10 can finally be obtained by performing (T1–T2).

Figure 5:
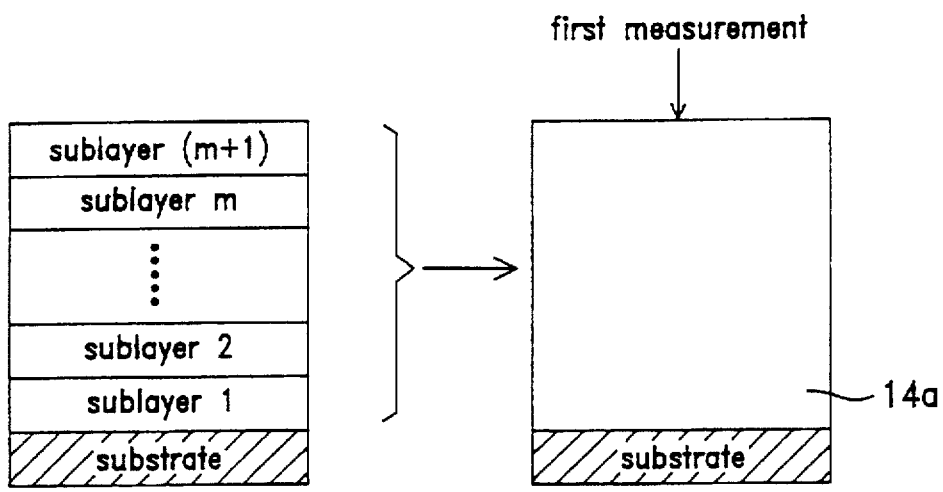
FIG. 5 is a third embodiment of the present invention.

The method not only can be utilized in four layers but also in any mutilayer that is combined by at least three layers. For example, as shown in FIG. 5, a multi-layers with (m+1) sublayers is formed on a substrate 2, m=1, 2, 3, 4, . . . . Subayer 1, sublayer 2, . . . and sublayer m, sublayer (m+1) are respectively formed on the substrate. The multi-layers is reguarded as a sigle layer 14a and be formed by the same material. Further, the sublayer 1, the sublayer 2, . . . and the sublayer m are formed of the same material with sublayer (m+1). The top sublayer (m+1) is deposited on the sublayer m. The thickness of the sublayer (m+1) is the physical parameter that will be measured by this method.

Figure 6:
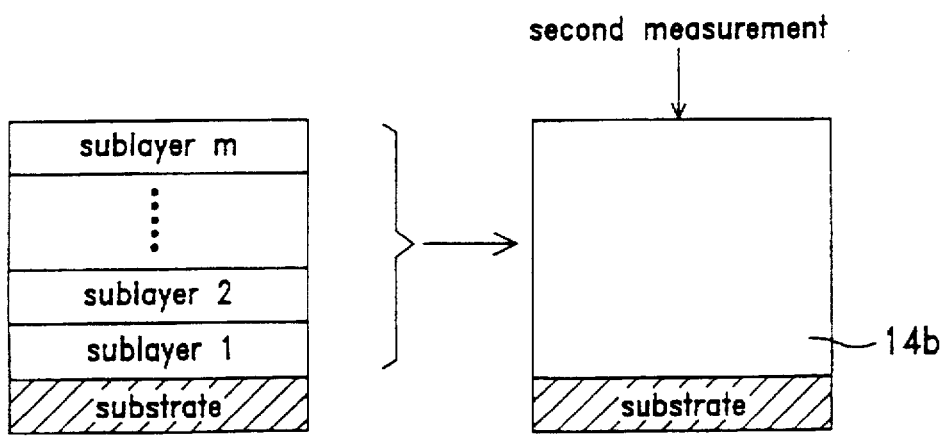
FIG. 6 is a third embodiment of the present invention.

Similarly, as seen in FIG. 6, the sublayer 1/sublayer 2/sublayer 3/ . . . /sublayer m is reguarded as a reduced layer 14b. Assume that the sublayer (m+1) is composed of material M. Then the multi-layers 14a becomes a double M layers formed on a substrate, that is a M layer and a M reduced layer 14b. A first measurement is performed to measure the thickness of the double M layers by using an ellipsometry. Next, a second measurement is done to measure the thickness of the reduced layer 14b by using an ellipsometry.

First, still turning to FIG. 5, assume that the multi-layers 14a is composed of M. That is to say, all of the sublayers are formed of material M. Then a first measurement is performed by using ellipsometry. A first fictional pseudo-thickness (T1) of the layer 14a can be obtained.

Referring to FIG. 6, the second step of the method is to strip the sublayer (M+1), i.e. the M layer. As if the entire reduced layer 14b is made of the material of the top layer.

Still referring to FIG. 6, further assume that the sublayer 1/sublayer 2/sublayer 3/ . . . /sublayer m 14b is still composed of material M. Subsequently, a second measurement is done by using ellipsometry to acquir a second fictional pseudo-thickness (T2) of the layer 14b.

The real thickness of the sublayer (m+1) can finally be obtained by performing (T1–T2).

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. Thus, while the preferred embodiment of the invention has been illustrated and described, it will be appreciated that various changes can be made therein without departing from the spirit and scope of the invention.

What is claimed is:

1. A method of measuring an actual thickness of a top layer of some material on the top of a multi-layers having at least three sublayers formed on a substrate, the other sublayers are not made of said material of said top layer, said method comprising the steps of:

assuming all of the layers in said multi-layer being made of said material of said top layer;

performing a first measurement to said multi-layers by using an ellipsometry to obtain a first fictional pseudo-thickness of said multi-layers;

stripping said top layer to form a reduced layer consisting of said other sublayers;

assuming said reduced layer being made of said material of said top layer;

performing a second measurement to said reduced layer by using said ellipsometry to obtain a second fictional pseudo-thickness of said reduced layer; and obtaining said actual thickness of said top layer, said actual thickness being the difference of said first fictional pseudo-thickness and said second fictional pseudo-thickness.

2. A method of measuring an actual thickness of a (m+1)th sublayer of a multi-layers having (m+1) sublayers which is formed on a substrate, said multi-layers and said substrate are formed of substrate/sublayer 1/sublayer 2/sublayer 3/ . . . /sublayer m/sublayer (m+1), m=1, 2, 3, . . . postive integer, said (m+1)th sublayer is a top layer of some material on the top of said multi-layers, the other sublayers are not made of said material of said top layer, said method comprising the steps of:

assuming all of the layers in said multi-layer being made of said material of said top layer;

performing a first measurement to said multi-layers consisting of sublayer 1/sublayer 2/sublayer 3/ . . . /sublayer m/sublayer (m+1) by using an ellipsometry to obtain a first fictional pseudo-thickness of said multi-layers;

stripping said top layer to form a reduced layer consisting of sublayer 1/sublayer 2/sublayer 3/ . . . /sublayer m;

assuming said reduced layer being made of said material of said top layer; performing a second measurement to said reduced layer by using said ellipsometry to obtain a second fictional pseudo-thickness of said reduced layer; and obtaining said actual thickness of said top layer, said actual thickness being the difference of said first fictional pseudo-thickness and said second fictional pseudo-thickness.

3. A method of measuring an actual thickness of a top layer of some material on the top of a first multi-layers having at least three sublayers, the other sublayers are not made of said material of said top layer, said method comprising the steps of:

forming a second multi-layers consisting of said other sublayers on a substrate;

assuming all of the layers of said second multi-layer being made of said material of said top layer;

performing a first measurement to said second multi-layers by using an ellipsometry to obtain a first fictional pseudo-thickness of said first multi-layers; forming said top layer on said second multi-layers to form a first multi-layers;

assuming said second multi-layer being made of said material of said top layer; performing a second measurement to said first multi-layers layer by using said ellipsometry to obtain a second fictional pseudo-thickness of said second multi-layers; and obtaining said actual thickness of said top layer, said actual thickness being the difference of said first fictional pseudo-thickness and said second fictional pseudo-thickness.

4. A method of measuring an actual thickness of a (m+1)th sublayer of a multi-layers having (m+1) sublayers, said multi-layers and substrate are formed of substrate/sublayer 1/sublayer 2/sublayer 3/ . . . /sublayer m/sublayer (m+1), m=1, 2, 3, . . . said (m+1)th sublayer is a top layer of some material on the top of said multi-layers, the other sublayers are not made of said material of said top layer, said method comprising the steps of:

forming a first multi-layers on a substrate, said first multi-layers and said substrate are formed of substrate/ sublayer 1/sublayer 2/sublayer 3/ . . . /sublayer m/sublayer (m +1), m=1, 2, 3, . . . postive integer;

assuming all of the layers of said first multi-layer being made of said material of said top layer;

performing a first measurement to said first multi-layers (sublayer 1/sublayer 2/sublayer 3/ . . . /sublayer m/sublayer (m+1)) by using an ellipsometry to obtain a first fictional pseude-thickness of said first multi-layers; forming a sublayer (m+1) on said sublayer m to form a second multi-layers (sublayer 1/sublayer 2/sublayer 3/ . . . /sublayer m);

assuming said second multi-layer being made of said material of said top layer;

performing a second measurement to said second multi-layers by using said ellipsometry to obtain a second fictional pseude-thickness of said second multi-layers; and obtaining said actual thickness of said top layer, said actual thickness being the difference of said first fictional pseudo-thickness and said second fictional pseudo-thickness.

* * * * *